United States Patent
Chang et al.

(10) Patent No.: US 9,213,328 B2
(45) Date of Patent: Dec. 15, 2015

(54) COMPUTING DEVICE AND METHOD FOR DETECTING DEFECTIVE HARDWARE OF IMAGE MEASUREMENT MACHINE

(75) Inventors: Chih-Kuang Chang, New Taipei (TW); Hua-Wei Yang, Shenzhen (CN); Min-Jun Huang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 583 days.

(21) Appl. No.: 13/562,384

(22) Filed: Jul. 31, 2012

(65) Prior Publication Data
US 2013/0158930 A1  Jun. 20, 2013

(30) Foreign Application Priority Data
Dec. 20, 2011 (CN) .......................... 2011 1 0429294

(51) Int. Cl.
| | |
|---|---|
| G01P 21/00 | (2006.01) |
| G05B 19/00 | (2006.01) |
| G06F 11/00 | (2006.01) |
| G06F 11/22 | (2006.01) |
| G06F 11/32 | (2006.01) |
| G01B 11/24 | (2006.01) |

(52) U.S. Cl.
CPC ................ *G05B 19/00* (2013.01); *G06F 11/00* (2013.01); *G06F 11/2252* (2013.01); *G01B 11/24* (2013.01); *G06F 11/321* (2013.01)

(58) Field of Classification Search
USPC ........................................................ 702/108
See application file for complete search history.

(56) References Cited

U.S. PATENT DOCUMENTS

| | | | | |
|---|---|---|---|---|
| 4,422,745 | A | * | 12/1983 | Hopson .......................... 396/211 |
| 5,958,079 | A | * | 9/1999 | Yoshimura ...................... 714/766 |
| 6,230,195 | B1 | * | 5/2001 | Sugawara et al. .............. 709/220 |
| 2003/0100343 | A1 | * | 5/2003 | Zourntos et al. ............... 455/562 |
| 2004/0035939 | A1 | * | 2/2004 | Lin ................................. 235/487 |
| 2006/0100972 | A1 | * | 5/2006 | Chianese et al. .................. 707/1 |
| 2007/0080205 | A1 | * | 4/2007 | You et al. ....................... 235/375 |
| 2009/0164849 | A1 | * | 6/2009 | Sugaya ........................... 714/38 |
| 2011/0202554 | A1 | * | 8/2011 | Powilleit et al. ............... 707/769 |
| 2012/0019674 | A1 | * | 1/2012 | Ohnishi et al. .............. 348/207.1 |

* cited by examiner

*Primary Examiner* — Paul D Lee
(74) *Attorney, Agent, or Firm* — Novak Druce Connolly Bove + Quigg LLP

(57) ABSTRACT

A method for detecting defective hardware of an image measurement machine, the method creates a hardware-recording table that records abnormalities to occur in hardware components of the image measurement machine, and detects device connecting faults, port connecting faults, and hardware faults of the image measurement machine. If any fault is detected, the method searches a serial number and one or more solutions for the fault from the hardware-recording table, and displays the serial number and the one or more solutions on a display screen of the computing device.

12 Claims, 4 Drawing Sheets

| Abnormalities | Serial number | Solutions |
| --- | --- | --- |
| Device connecting fault of PMAC card | A001 | 1. Check whether a power supply of the PMAC card is turned on; 2. Check whether a serial port bus is connected to the PMAC card. |
| Port connecting fault of PMAC card | A002 | Check whether a serial port of the PMAC card is correctly set, and setting a new serial port to the PMAC card. |
| Abnormality of data read by grating scale | A003 | 1. Move one mechanism axis of the image measurement machine, and checking whether the data read by the grating scale is changed; 2. Checking whether the grating scale is hardly fixed on the image measurement machine; 3. Checking whether circuitry between the grating scale and the PMAC card is in normal state. |
| Device connecting fault of light control card | L001 | Testing voltage of the light control card. |
| Port connecting fault of light control card | L002 | Check whether a serial port of the light control card is correctly set, and setting a new serial port to the light control card. |
| Device connecting fault of motor control card | Z001 | Check whether circuitry of the motor control card is in normal state. |
| Port connecting fault of motor control card | Z002 | Check whether a serial port of the motor control card is correctly set, and setting a new serial port to the motor control card. |
| Device connecting fault of handle control card | H001 | Check a serial port of the handle is correctly set, and whether a drive of the handle control card is installed in the image measurement machine. |

FIG. 3

COMPUTING DEVICE AND METHOD FOR DETECTING DEFECTIVE HARDWARE OF IMAGE MEASUREMENT MACHINE

TECHNICAL FIELD

Embodiments of the present disclosure generally relate to management of image capturing devices, and more particularly to a computing device and a method for detecting hardware of an image measurement machine using the computing device.

DESCRIPTION OF RELATED ART

Image measurement machines (IMMs) are widely used in industry to measure manufactured parts. Measurements of an image of a manufactured part can determine whether the manufactured part meets design specifications and to provide information for improvements in process control. During measuring the image of the manufactured part, defective hardware of the IMM may result in erroneous measurements. To find defective hardware, an operator needs to manually determine which hardware of the IMM has a fault, this waste time and effect manufacturing speed. Thus, an improved system and method addressing the aforementioned issues are desired.

BRIEF DESCRIPTION OF THE DRAWINGS

FIG. 3 is a schematic diagram illustrating creation of a hardware-recording table.

DETAILED DESCRIPTION

In general, the term "module," as used herein, refers to logic embodied in hardware or firmware, or to a collection of software instructions, written in a programming language, such as, for example, Java, C, or assembly. One or more software instructions in the modules may be embedded in firmware, such as in an erasable-programmable read-only memory (EPROM). It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable medium or computer storage device.

Figure 1:
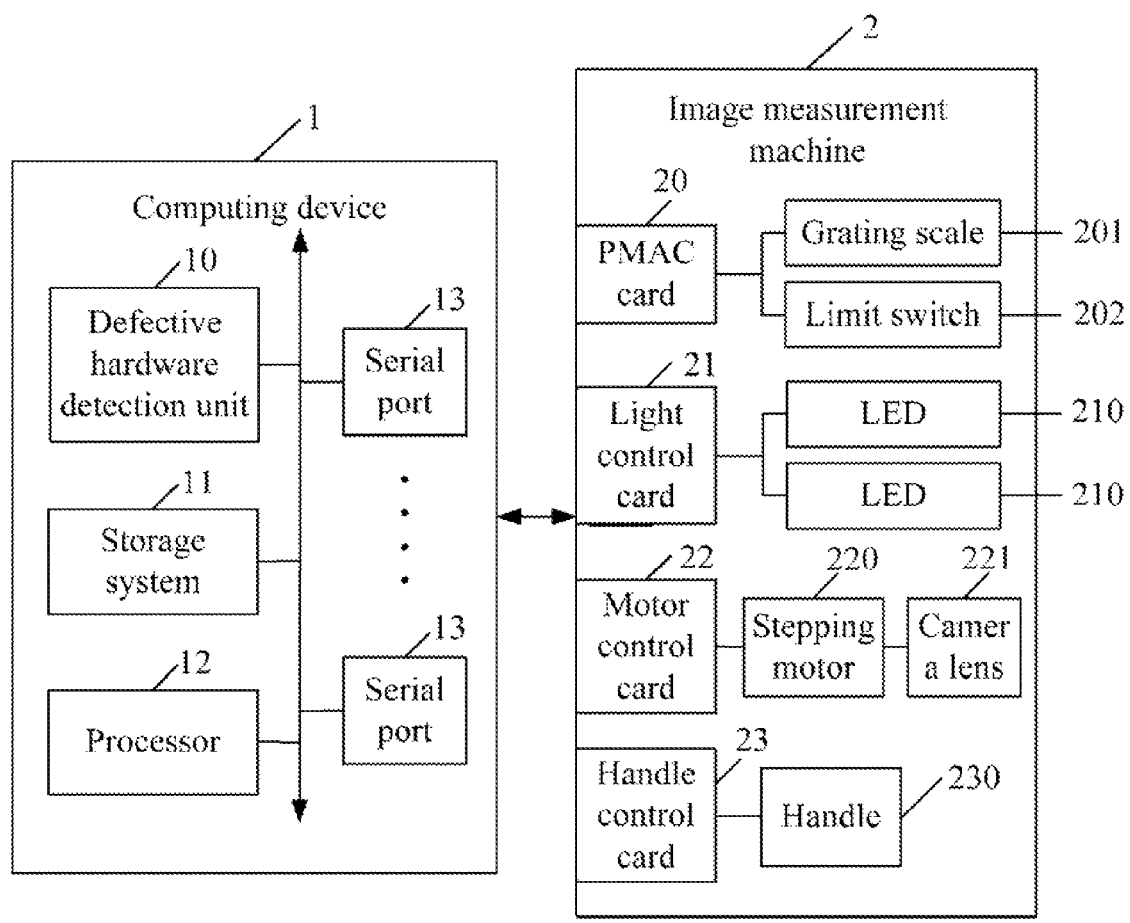
FIG. 1 is a block diagram of one embodiment of a computing device including a defective hardware detection unit.

FIG. 1 is a block diagram of one embodiment of a computing device 1 including a defective hardware detection unit 10. In the embodiment, the computing device 1 communicates with an image measurement machine 2. The computing device 1 may further include a storage system 11, at least one processor 12, and a plurality of serial ports 13. The defective hardware detection unit 10 may detect whether any hardware component of the image measurement machine 2 works abnormally. One or more computerized codes of the defective hardware detection unit 10 are stored in the storage system 11 and executed by the at least one processor 12.

In one embodiment, the image measurement machine 2 includes, but is not limited to, a programmable multi-axes controller (PMAC) card 20, a light control card 21, a motor control card 22, and a handle control card 23. In the embodiment, each of the cards 20, 21, 22, and 23 connects to the computing device 1 via one of the plurality of serial ports 13. In other embodiment, the handle control card 23 also can connect to the computing device 1 via a universal serial bus (USB) port of the computing device 1.

The PMAC card 20 at least connects to a grating scale 201 and a limit switch 202, and can obtain status information returned by the grating scale 201 and the limit switch 202. After transmitting the status information of the grating scale 201 and the limit switch 202 to the computing device 1, the defective hardware detection unit 10 can detect whether the grating scale 201 or the limit switch 202 has faults.

The light control card 21 connects to one or more light emitting diodes (LEDs) 210, controls the one or more LEDs 210 to power on or power off, and adjusts luminance of the LEDs. The motor control card 22 connects to a stepping motor 220, and controls the stepping motor 220 to adjust scale of an optical lens 221 of the image measurement machine 2. The handle control card 23 connects to a handle 230 of the image measurement machine 2, and uses the handle 230 to control movements of mechanical axes of the image measurement machine 2.

Figure 2:
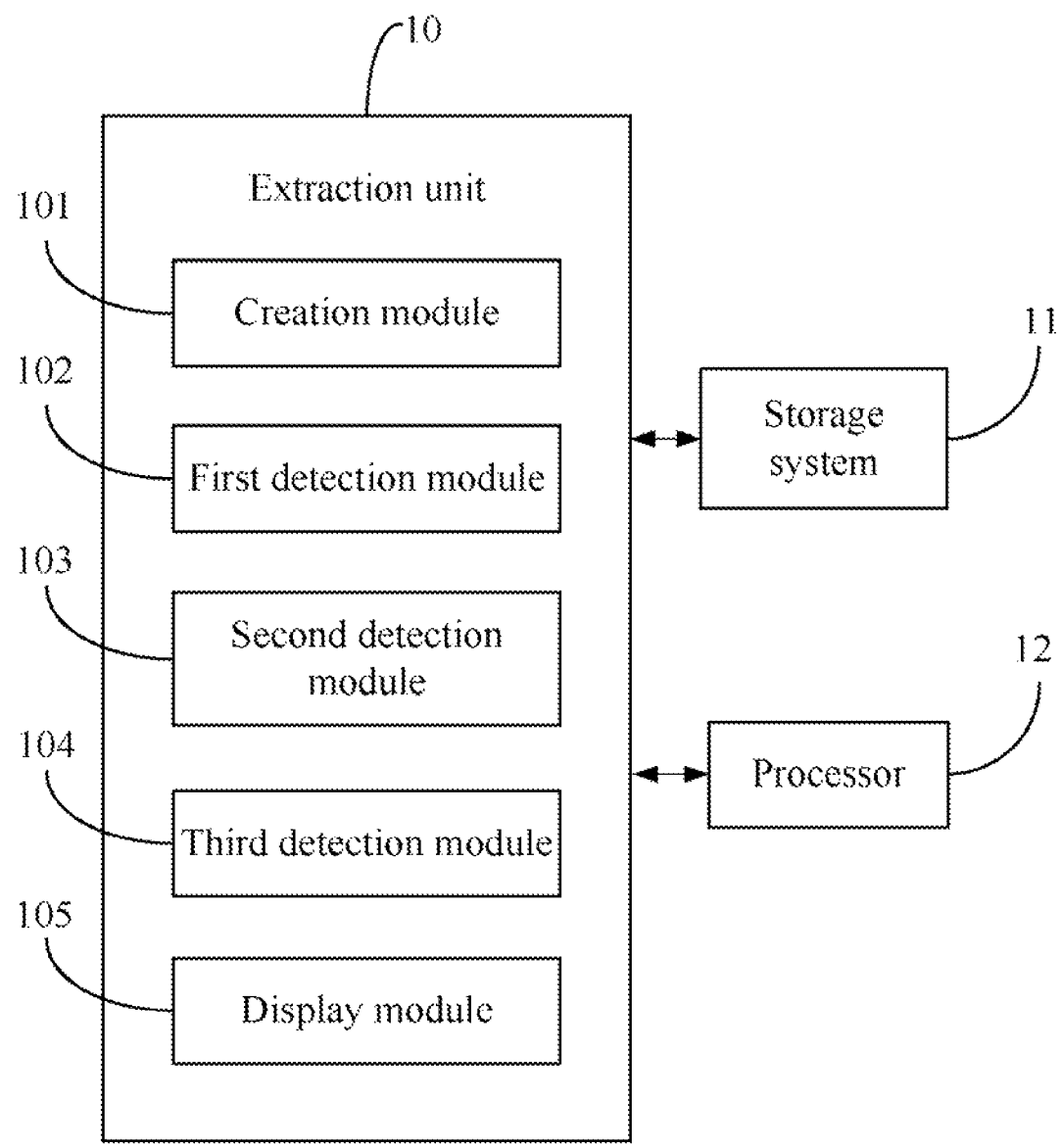
FIG. 2 is a block diagram of one embodiment of function modules of the defective hardware detection unit of FIG. 1.

FIG. 2 is a block diagram of one embodiment of function modules of the defective hardware detection unit 10 of FIG. 1. In one embodiment, the defective hardware detection unit 10 includes a creation module 101, a first detection module 102, a second detection module 103, a third detection module 104, and a display module 105. Each of the modules 101-105 may be a software program including one or more computerized instructions that are stored in the storage system 11 and executed by the processor 12.

In one embodiment, the storage system 11 may be a magnetic or an optical storage system, such as a hard disk drive, an optical disk drive, a compact disc, a digital video disc, a tape drive, or other suitable storage medium. The processor 12 may be a central processing unit including a math co-processor, for example.

The creation module 101 creates a hardware-recording table, which is used for recording abnormalities that may be occurred in hardware components of the image measurement machine 2. As shown in FIG. 3, each of the abnormalities corresponds to a serial number, a name of a hardware component, and one or more solutions for solving the abnormality of the hardware component. The creation module 101 further saves the hardware-recording table in the storage system 11.

The first detection module 102 detects device connecting faults of the image measurement machine 2 by detecting whether each of the PMAC card 20, the light control card 21, the motor control card 22, and the handle control card 23 connects to the computing device 1. In detail, the first detection module 102 sends a detection command to each of the cards 20-23, and detects whether each of the cards 20-23 transmits a response signal to the computing device 1 in response to the detection command.

If each of the cards 20-23 transmits a response signal to the computing device 1, the first detection module 102 determines that the cards 20-23 are correctly connected to the computing device 1. Otherwise, if any one of the cards 20-23 does not transmit a response signal to the computing device 1, the first detection module 102 determines that the card is not correctly connected to the computing device 1. For example, if the PMAC card 20 does not return a response signal to the computer device 1, the first detection module 102 determines that the PMAC card 20 has a device connecting fault to the computing device 1, such as the PMAC card 20 is not properly connected or may be disconnected from the computing device 1.

The second detection module 103 detects port connecting faults of the image measurement machine 2 by detecting whether the serial ports 13 connected to each of the cards 20-23 match preset serial ports.

In detail, each of the cards 20-23 has a preset serial port, the second detection module 103 detects whether the serial ports 13 connected to each of the cards 20-23 match preset serial ports. For example, the second detection module 103 scans a serial number of the serial ports 13 actually connected to the PMAC card 20, and determines whether the serial ports 13 are correct by comparing the scanned serial number with a serial number of a corresponding preset serial port. If the scanned serial number is identical to the serial number of the corresponding preset serial ports, the second detection module 103 determines that the PMAC card 20 does not have a port connecting fault. If the scanned serial number is different from the serial number of the corresponding preset serial ports, the second detection module 103 determines that the PMAC card 20 has a port connecting fault.

The third detection module 104 obtains status information transmitted by the hardware components that are connected to each of the cards 20-23, and detects whether any one of the hardware components has an abnormality according to the status information.

For example, the third detection module 104 may determine whether the grating scale 201 has the abnormality according to the data read by the grating scale 201. In detail, if the data read by the grating scale 201 is empty, or the data is not changed when any mechanical axis of the image measurement machine 2 moves, the third detection module 104 determines that the grating scale 201 has the abnormality. If the limit switch 202 transmits a triggering signal the computing device 1 for indicating that the limit switch 202 cannot work normally, the third detection module 104 determines that the limit switch 202 has the abnormality. If the scale of the optical lens 221 is not equal to a preset scale, the third detection module 104 receives the data containing the scale transmitted by the optical lens 221, and determines that the optical lens 221 has the abnormality.

If the image measurement machine 2 has device connecting faults, port connecting faults, or any one of the hardware components has an abnormality, the display module 105 searches a serial number and solutions for the abnormality from the hardware-recording table, and displays the serial number and the solutions on a display screen of the computing device 1.

Figure 4:
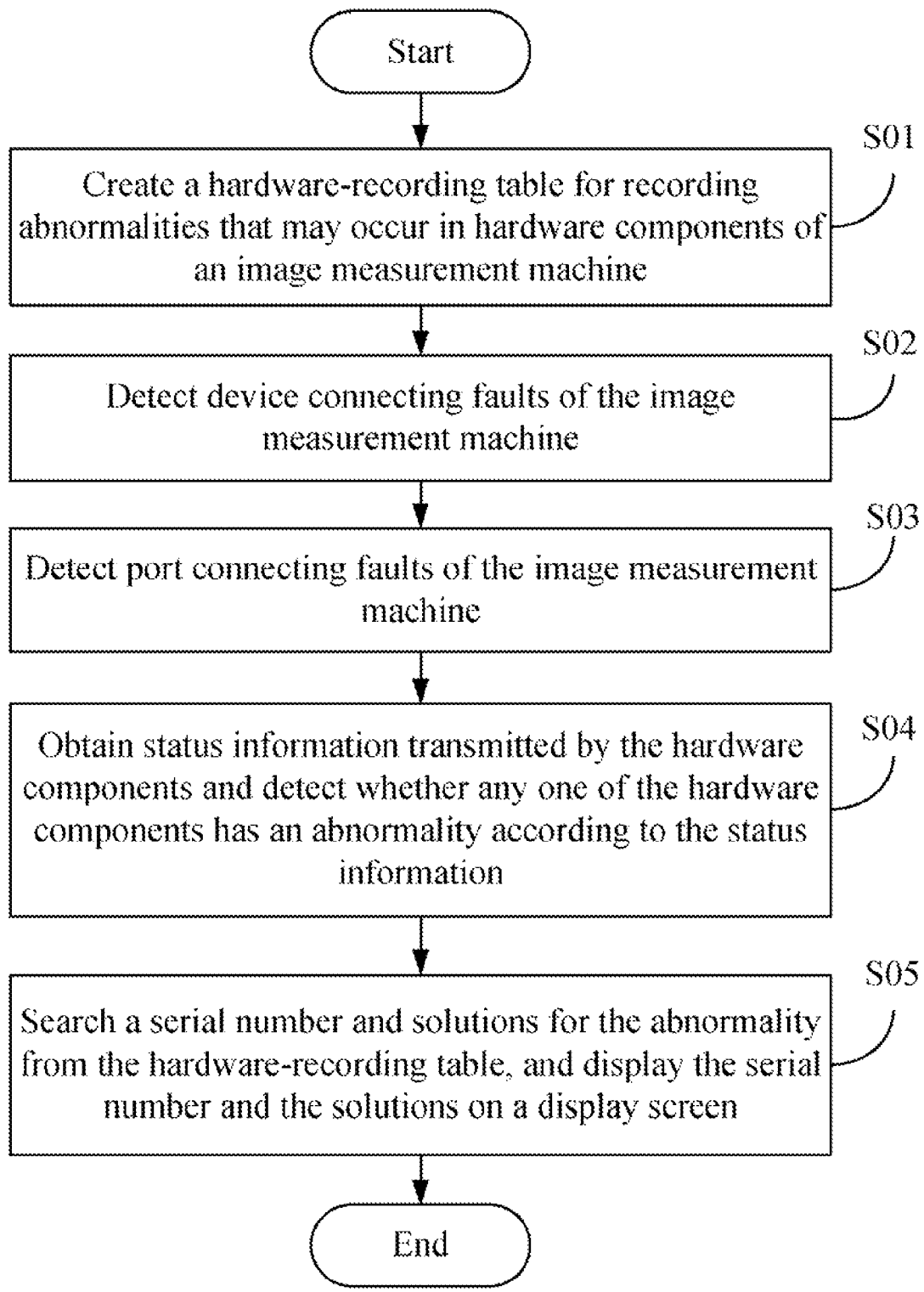
FIG. 4 is a flowchart illustrating one embodiment of a method for detecting defective hardware of an image measurement machine using the computing device of FIG. 1.

FIG. 4 is a flowchart illustrating one embodiment of a method for detecting defective hardware of the image measurement machine 2 using the computing device 1 of FIG. 1. Depending on the embodiment, additional steps may be added, others removed, and the ordering of the steps may be changed.

In step S01, the creation module 101 creates a hardware-recording table, which is used for recording abnormalities that may be occurred in hardware components of the image measurement machine 2. As shown in FIG. 3, each of the abnormalities corresponds to a serial number, a name of a hardware component, and one or more solutions for solving the abnormality of the hardware component.

In step S02, the first detection module 102 detects device connecting faults of the image measurement machine 2 by detecting whether each of the PMAC card 20, the light control card 21, the motor control card 22, and the handle control card 23 is correctly connected to the computing device 1.

In step S03, the second detection module 103 detects port connecting faults of the image measurement machine 2 by detecting whether the serial ports 13 connected to each of the cards 20-23 match corresponding preset serial ports. If the serial ports 13 connected to each of the cards 20-23 match the corresponding preset serial ports, the second detection module 103 determines that the cards 20-23 do not have the port connecting faults. If the serial ports 13 connected to any one of the cards 20-23 are different from the corresponding preset serial ports, the second detection module 103 determines that the card has the port connecting faults.

In step S04, the third detection module 104 obtains status information transmitted by the hardware components that are connected to each of the cards 20-23, and detects whether any one of the hardware components has an abnormality according to the status information.

If any abnormality is found in step S02, step S03, or step S04, in step S05, the display module 105 searches a serial number and solutions corresponding to the abnormality from the hardware-recording table, and displays the serial number and the solutions on the display screen of the computing device 1.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method of a computing device for detecting defective hardware of an image measurement machine, the method comprising:
    creating, in a non-transitory storage medium, a hardware-recording table that records abnormalities occurred in hardware components of the image measurement machine, each of the abnormalities corresponding to a serial number, a name of the hardware component having the abnormality, and one or more solutions for solving the abnormality of the hardware component;
    detecting device connecting faults of the image measurement machine by detecting whether all hardware control cards of the image measurement machine connect to the computing device, each of the hardware control cards connecting to one or more hardware components, wherein the hardware control cards comprise a programmable multi-axes controller card, a light control card, a motor control card, and a handle control card;
    detecting port connecting faults of the image measurement machine by detecting whether serial ports connected to each of the hardware control cards match preset serial ports;
    obtaining status information transmitted by the hardware components connected to each of the hardware control cards, and detecting whether any one of the hardware components has an abnormality according to the status information;
    searching a corresponding serial number and solutions for the abnormality from the hardware-recording table, upon the condition that the image measurement machine has device connecting faults, port connecting faults, or any one of the hardware components has an abnormality; and
    displaying the corresponding serial number and the solutions on a display screen of the computing device.

2. The method as described in claim 1, wherein the detecting device connecting faults step comprises:

sending a detection command to each of the hardware control cards;

determining that the hardware control card is correctly connected to the computing device, upon the condition that the hardware control card transmits a response signal to the computing device; and determining that the hardware control card is not correctly connected to the computing device, upon the condition that the hardware control card does not transmit a response signal to the computing device.

3. The method as described in claim 1, wherein the detecting port connecting faults step comprises:

scanning a serial number of the serial ports connected to each of the hardware control cards;

determining whether the serial ports are correctly connected to the hardware control card by comparing the scanned serial number of the serial port with a serial number of preset serial ports;

determining that the hardware control card does not have a port connecting fault, upon the condition that the scanned serial number is identical to the serial number of the preset serial port; and determining that the hardware control card has a port connecting fault, upon the condition that the scanned serial number is different from the serial number of the preset serial ports.

4. The method as described in claim 1, wherein the programmable multi-axes controller card at least connects to a grating scale and a limit switch, the light control card connects to one or more light emitting lights, the motor control card connects to a stepping motor, and the handle control card connects to a handle.

5. A computing device for detecting defective hardware of an image measurement machine, the computing device comprising:

at least one processor;

a non-transitory storage medium; and one or more modules that are stored in the non-transitory storage medium and executed by the at least one processor, the one or more modules comprising:

a creation module that creates, in the non-transitory storage medium, a hardware-recording table that records abnormalities occurred in hardware components of the image measurement machine, each of the abnormalities corresponding to a serial number, a name of the hardware component having the abnormality, and one or more solutions for solving the abnormality of the hardware component;

a first detection module that detects device connecting faults of the image measurement machine by detecting whether all hardware control cards of the image measurement machine connect to the computing device, each of the hardware control cards connecting to one or more hardware components, wherein the hardware control cards comprise a programmable multi-axes controller card, a light control card, a motor control card, and a handle control card;

a second detection module that detects port connecting faults of the image measurement machine by detecting whether serial ports connected to each of the hardware control cards match preset serial ports;

a third detection module that obtains status information transmitted by the hardware components connected to each of the hardware control cards, and detects whether any one of the hardware components has an abnormality according to the status information; and a display module that searches a corresponding serial number and solutions for the abnormality from the hardware-recording table, upon the condition that the image measurement machine has device connecting faults, port connecting faults, or any one of the hardware components has an abnormality, and displays the corresponding serial number and the solutions on a display screen of the computing device.

6. The computing device as described in claim 5, wherein the first detection module detects the device connecting faults by performing steps of:

sending a detection command to each of the hardware control cards;

determining that the hardware control card is correctly connected to the computing device, upon the condition that the hardware control card transmits a response signal to the computing device; and determining that the hardware control card is not correctly connected to the computing device, upon the condition that the hardware control card does not transmit a response signal to the computing device.

7. The computing device as described in claim 5, wherein the second module detects the port connecting faults by performing steps of:

scanning a serial number of the serial ports connected to each of the hardware control cards;

determining whether the serial ports are correctly connected to the hardware control card by comparing the scanned serial number of the serial port with a serial number of preset serial ports;

determining that the hardware control card does not have a port connecting fault, upon the condition that the scanned serial number is identical to the serial number of the preset serial port; and determining that the hardware control card has a port connecting fault, upon the condition that the scanned serial number is different from the serial number of the preset serial ports.

8. The computing device as described in claim 5, wherein the programmable multi-axes controller card at least connects to a grating scale and a limit switch, the light control card connects to one or more light emitting lights, the motor control card connects to a stepping motor, and the handle control card connects to a handle.

9. A non-transitory storage medium having stored thereon instructions that, when executed by a processor of a computing device, cause the computing device to perform a method for detecting defective hardware of an image measurement machine, the method comprising:

creating, in the non-transitory storage medium, a hardware-recording table that records abnormalities occurred in hardware components of the image measurement machine, each of the abnormalities corresponding to a serial number, a name of the hardware component having the abnormality, and one or more solutions for solving the abnormality of the hardware component;

detecting device connecting faults of the image measurement machine by detecting whether all hardware control cards of the image measurement machine connect to the computing device, each of the hardware control cards connecting to one or more hardware components, wherein the hardware control cards comprise a programmable multi-axes controller card, a light control card, a motor control card, and a handle control card;

detecting port connecting faults of the image measurement machine by detecting whether serial ports connected to each of the hardware control cards match preset serial ports;

obtaining status information transmitted by the hardware components connected to each of the hardware control cards, and detecting whether any one of the hardware components has an abnormality according to the status information;

searching a corresponding serial number and solutions for the abnormality from the hardware-recording table, upon the condition that the image measurement machine has device connecting faults, port connecting faults, or any one of the hardware components has an abnormality; and displaying the corresponding serial number and the solutions on a display screen of the computing device.

10. The non-transitory storage medium as described in claim 9, wherein detecting device connecting faults comprises:

sending a detection command to each of the hardware control cards;

determining that the hardware control card is correctly connected to the computing device, upon the condition that the hardware control card transmits a response signal to the computing device; and determining that the hardware control card is not correctly connected to the computing device, upon the condition that the hardware control card does not transmit a response signal to the computing device.

11. The non-transitory storage medium as described in claim 9, wherein detecting port connecting faults comprises:

scanning a serial number of the serial ports connected to each of the hardware control cards;

determining whether the serial ports are correctly connected to the hardware control card by comparing the scanned serial number of the serial port with a serial number of preset serial ports;

determining that the hardware control card does not have a port connecting fault, upon the condition that the scanned serial number is identical to the serial number of the preset serial port; and determining that the hardware control card has a port connecting fault, upon the condition that the scanned serial number is different from the serial number of the preset serial ports.

12. The non-transitory storage medium as described in claim 9, wherein the programmable multi-axes controller card at least connects to a grating scale and a limit switch, the light control card connects to one more light emitting lights, the motor control card connects to a stepping motor, and the handle control card connects to a handle.

* * * * *